(12) United States Patent
Lee et al.

(10) Patent No.: US 9,233,601 B2
(45) Date of Patent: Jan. 12, 2016

(54) STRUCTURE OF SUNROOF DEFLECTOR

(71) Applicants: Hyundai Motor Company, Seoul (KR);
Inalfa Roof Systems Group B.V., AB Venray (NL)

(72) Inventors: Jeong-Min Lee, Busan-shi (KR);
Hwa-Kyoung Sung, Hwasung-shi (KR)

(73) Assignees: Hyundai Motor Company, Seoul (KR);
Inalfa Roof Systems Group B.V., AB Venray (NL)

( * ) Notice: Subject to any disclaimer, the term of this patent is extended or adjusted under 35 U.S.C. 154(b) by 0 days.

(21) Appl. No.: 14/509,958

(22) Filed: Oct. 8, 2014

(65) Prior Publication Data

US 2015/0108796 A1    Apr. 23, 2015

(30) Foreign Application Priority Data

Oct. 22, 2013  (KR) .......................... 10-2013-125693

(51) Int. Cl.
*B60J 7/22* (2006.01)
*B60J 7/043* (2006.01)

(52) U.S. Cl.
CPC ... *B60J 7/22* (2013.01); *B60J 7/043* (2013.01)

(58) Field of Classification Search
CPC .................................. B60J 7/22; B60J 7/223
USPC ....................................................... 296/217
See application file for complete search history.

(56) References Cited

U.S. PATENT DOCUMENTS 6,286,899 B1 *   9/2001   Hirschvogel et al. ......... 296/217

FOREIGN PATENT DOCUMENTS

| DE | 19520348 | * | 8/1996 |
| DE | 102008058158 | * | 5/2010 |
| EP | 0 747 251 B1 | | 6/1999 |
| JP | 2000-6667 A | | 1/2000 |
| KR | 10-2004-0076953 A | | 9/2004 |
| KR | 10-1154319 B1 | | 6/2012 |

* cited by examiner

*Primary Examiner* — Dennis H Pedder
(74) *Attorney, Agent, or Firm* — Morgan, Lewis & Bockius LLP

(57) ABSTRACT

A structure of a sunroof deflector may include a roof panel which is disposed at a ceiling of a vehicle, and has an opening portion that is openable and closable by a sunroof glass; a sunroof frame, a deflector bracket disposed between a rainwater drainage portion and a sealing weather strip, a first deflector which is accommodated in the deflector bracket to be slidable upward and downward, selectively protrudes to an outside of the opening portion, and has a first catching portion formed to a rear surface of an upper end thereof; a second deflector which is accommodated in the deflector bracket to be slidable upward and downward, selectively protrudes to the outside of the opening portion, and has a second catching portion that is formed to a front surface of a lower end thereof and protrudes to be selectively caught by the first catching portion.

7 Claims, 6 Drawing Sheets

STRUCTURE OF SUNROOF DEFLECTOR

CROSS-REFERENCE TO RELATED APPLICATIONS

The present application claims priority to Korean Patent Application No. 10-2013-125693, filed on Oct. 22, 2013, the entire contents of which is incorporated herein for all purposes by this reference.

BACKGROUND OF THE INVENTION

1. Field of the Invention

The present invention relates to a structure of a sunroof deflector that is mounted outside a sealing weather strip of a vehicle, and more particularly, to a structure of a sunroof deflector which includes hard type first and second deflectors that are accommodated in a deflector bracket, which is disposed between a rainwater drainage portion and a sealing weather strip, to be slidable upward and downward, and may protrude to the outside of an opening portion of a roof panel.

2. Description of Related Art

An opening portion may be formed in a roof panel of a vehicle in order to discharge air inside the vehicle to the outside and allow air outside the vehicle to flow into the vehicle, and a sunroof may be mounted in the opening portion to be openable or closable.

Particularly, recently, a panoramic sunroof, in which most of the roof panel of the vehicle is manufactured using glass, and a part of the roof panel is selectively opened and closed, is being widely used for the purpose of allowing openness and enhancing aesthetic design.

The virtue of this panoramic sunroof allows a large amount of natural sunlight into the vehicle when the vehicle is driven or stopped, and the driver may enjoy driving the vehicle by opening the panoramic sunroof when the vehicle is traveling.

In general, a deflector, which serves to change a direction of wind, which is generated when the vehicle travels, upward to prevent the wind from flowing into the vehicle through the opening portion when the vehicle travels in a state in which the opening portion is opened, is installed at a front side of the opening portion formed in the roof panel.

The deflector is operated in a manner in which the deflector is tilted upward by a separate electrically-powered device or in a manner in which the deflector is tilted upward by elastic force of a spring, which has compressed the deflector, at the same time of opening the sunroof glass.

The aforementioned deflector of the panoramic sunroof is widely classified into an outside type deflector in which a deflector is positioned inside a rainwater drainage portion that is formed outside a sealing weather strip attached to a sunroof frame of the vehicle, and an inside type deflector in which a deflector is positioned in the sealing weather strip.

The outside type deflector may be quickly lifted upward when the sunroof glass is opened, and thus advantageous in blocking drone noise. Further, the outside type deflector is also advantageous in terms of a length at which the sunroof glass is opened, in comparison with the inside type deflector.

As illustrated in FIG. 1A, a sunroof deflector in the related art which is disposed outside a sealing weather strip has a structure in which a fabric type deflector 4 is accommodated in a rainwater drainage portion 3 that is installed at a front side of a sealing weather strip 2 attached to a sunroof frame 1 of a vehicle, a lower end of the deflector 4 is coupled to a fixing plate 5, and a deflector beam 6 is coupled to an upper end of the deflector 4.

However, as illustrated in FIG. 1B, according to the structure of the sunroof deflector in the related art, since the deflector 4 is accommodated in the rainwater drainage portion 3 disposed outside the sealing weather strip 2, there is a problem in that the fabric type deflector 4 becomes frozen and adhered due to inflow of moisture during cold weather in a state in which the deflector 4 becomes folded, and as a result, the deflector 4 cannot be smoothly tilted upward.

In a case in which a hard type deflector is used instead of the fabric type deflector in order to resolve the aforementioned problem, a deflector having a low height is inevitably mounted due to a limitation of an accommodating space in the sunroof frame, and as a result, there is a problem in that drone noise, which is generated by resonance caused by air inside the vehicle and vibration of air, in a low-frequency range, passing through the opening portion of the sunroof when the vehicle travels at a low or medium speed, is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a sunroof deflector which resolves a problem that a deflector is frozen due to inflow of moisture while maintaining an advantage of an outside type deflector in which a deflector is disposed outside a sealing weather strip, and minimizes drone noise, which is generated due to a limitation to a height of a hard type deflector, by configuring the deflector in a multiple-stage structure.

In an aspect of the present invention, a structure of a sunroof deflector may include a roof panel which is disposed at a ceiling of a vehicle, and may have an opening portion that is openable and closable by a sunroof glass, a sunroof frame which is coupled around the opening portion, and may include a front frame that is coupled at a front side of the opening portion, a rear frame that is coupled at a rear side of the opening portion, and a pair of side frames that is coupled to lateral sides of the opening portion, a deflector bracket which is disposed between a rainwater drainage portion and a sealing weather strip that are formed at the front frame, and coupled in a vehicle width direction, a first deflector which is accommodated in the deflector bracket to be slidable upward and downward, selectively protrudes to an outside of the opening portion, and may have a first catching portion formed to a rear surface of an upper end thereof, a second deflector which is accommodated in the deflector bracket to be slidable upward and downward, selectively protrudes to the outside of the opening portion, and may have a second catching portion that is formed to a front surface of a lower end thereof and protrudes to be selectively caught by the first catching portion, and at least a deflector arm, each of the deflector arm including a rear end portion rotatably coupled to one of the side frames, and a front end portion coupled to a side of an upper end of the second deflector to move the second deflector upward and downward, wherein when the second deflector is moved upward in a state in which the second catching portion is caught by the first catching portion, the first deflector protrudes to the outside of the opening portion.

A plurality of guide units, which is formed as a rail, is vertically coupled to a rear surface of the first deflector between a lower end portion and the first catching portion of the first deflector, wherein the second catching portions of the second deflector may include a plurality of sliders which is accommodated in the guide units to be slidable upward and rearward, and a plurality of support portions which connects each of the sliders with the second deflector.

The slider may have a width identical to an inner width of the guide unit, and a center portion of a front surface of the slider is formed as a surface that is curved forward.

The first deflector and the second deflector each are formed as a 'ㄷ'-shaped plate both ends of which are bent rearward.

The first deflector and the second deflector each are made of one material of plastic, steel or aluminum.

The deflector bracket may further include a bracket projection that protrudes on an upper end inlet of the deflector bracket to prevent the first deflector from being completely pulled out of the deflector bracket.

The second deflector may further include a plurality of holes that horizontally penetrates the second deflector to minimize wind noise that is generated when the vehicle travels at a high speed.

According to the exemplary embodiment of the present invention having the aforementioned configurations, the first deflector and the second deflector are accommodated in the deflector bracket that is disposed between the rainwater drainage portion and the sealing weather strip, which are formed at the front frame, and coupled in a vehicle width direction, and the first deflector and the second deflector are accommodated separately from the rainwater drainage portion, thereby preventing the deflector from being frozen due to inflow of moisture while maintaining an advantage of an outside type deflector in which a deflector is disposed outside a sealing weather strip.

The deflector is accommodated in the deflector bracket, and configured as a hard type deflector instead of a fabric type deflector, thereby resolving a contamination problem of the fabric type deflector in the related art, and preventing the deflector from being caught by strong wind when the sunroof glass is closed.

The deflector includes the first deflector and the second deflector to maintain a high height of the deflector despite the hard type deflector, thereby minimizing drone noise.

The plurality of holes, which penetrates the second deflector, is horizontally formed in the second deflector, thereby minimizing wind noise that is generated when wind collides with the deflector which protrudes upward from the opening portion of the roof panel, while the vehicle is traveling at a high speed.

The first deflector and the second deflector are operated in a mechanical manner instead of an electronic manner, such that probability of a malfunction is low, the mechanical manner may be implemented with a comparatively low cost in comparison with the electronic manner, and the same layout as the structure of the sunroof deflector in the related art may be used to implement the mechanical manner.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
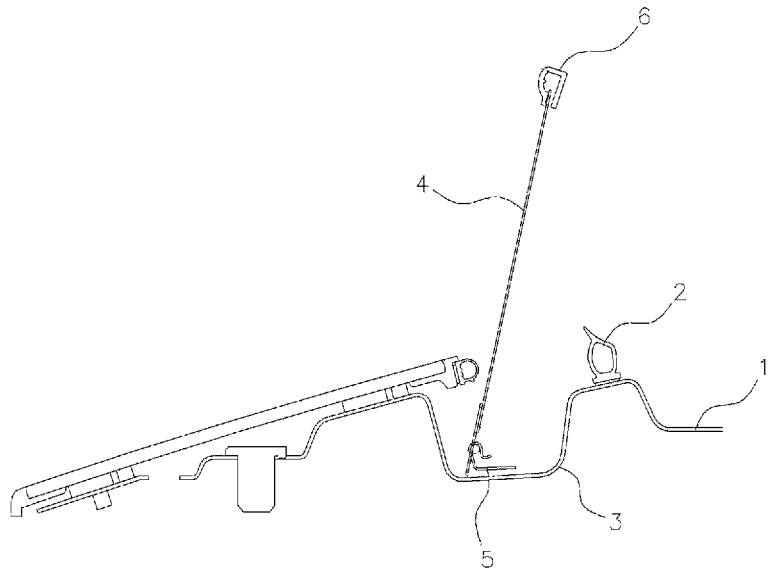
FIG. 1A is a cross-sectional view illustrating an appearance in which a deflector protrudes in a structure of a sunroof deflector in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

A structure of a sunroof deflector according an exemplary embodiment of the present invention includes: a roof panel 10 which is disposed at a ceiling of a vehicle, and has an opening portion 11 that may be opened and closed by a sunroof glass 12; a sunroof frame which is coupled around the opening portion 11, and includes a front frame 21 which is coupled at a front side of the opening portion 11, a rear frame 22 which is coupled at a rear side of the opening portion 11, and a pair of side frames 23 which is coupled at lateral sides of the opening portion 11; a deflector bracket 30 which is disposed between a rainwater drainage portion 24 and a sealing weather strip 25 that are formed at the front frame 21, and coupled in a vehicle width direction; a first deflector 40 which is accommodated in the deflector bracket 30 to be slidable upward and downward, may protrude to the outside of the opening portion 11, and has a first catching portion 41 that is coupled to a rear surface of an upper end of the first deflector 40; a second deflector 50 which is accommodated in the deflector bracket 30 to be slidable upward and downward, may protrude to the outside of the opening portion 11, and has a second catching portion 51 that is coupled to a front surface of a lower end of the second deflector 50 and protrudes to be caught by the first catching portion 41. a pair of deflector arms 60 which has rear end portions rotatably coupled to the side frames 23, and front end portions coupled to both sides of an upper end of the second deflector 50 to move the second deflector 50 upward and downward, in which when the second deflector 50 is moved upward in a state in which the second catching portion 51 is caught by the first catching portion 41, the first deflector 40 protrudes to the outside of the opening portion 11.

Figure 2:
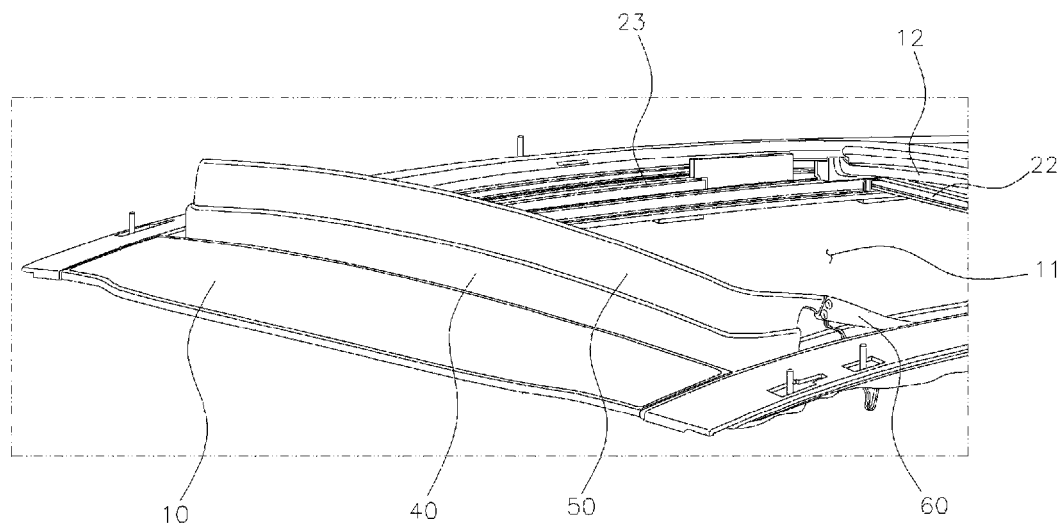
FIG. 2 is a partial perspective view illustrating an overall appearance of a structure of a sunroof deflector according to an exemplary embodiment of the present invention.

As illustrated in FIG. 2, the roof panel 10 is disposed to cover the ceiling of the vehicle, and has the opening portion 11, which is disposed in a forward and rearward direction of the vehicle to be openable and closable by the sunroof glass 12, to serve to ventilate the interior of the vehicle and provide openness to the interior of the vehicle.

The sunroof glass 12 is mounted to open and close the opening portion 11 in various manners such as a manner in which the sunroof glass 12 slides in the forward and rearward direction of the vehicle by a drive device such as a motor, or a manner in which the sunroof glass 12 is tilted up in an upward and downward direction of the vehicle.

The sunroof glass 12 is generally made of a material that effectively blocks ultraviolet rays and infrared rays, and specifically, the sunroof glass 12 may be made of various materials such as transparent glass, opaque glass, or synthetic resin.

Figure 3:
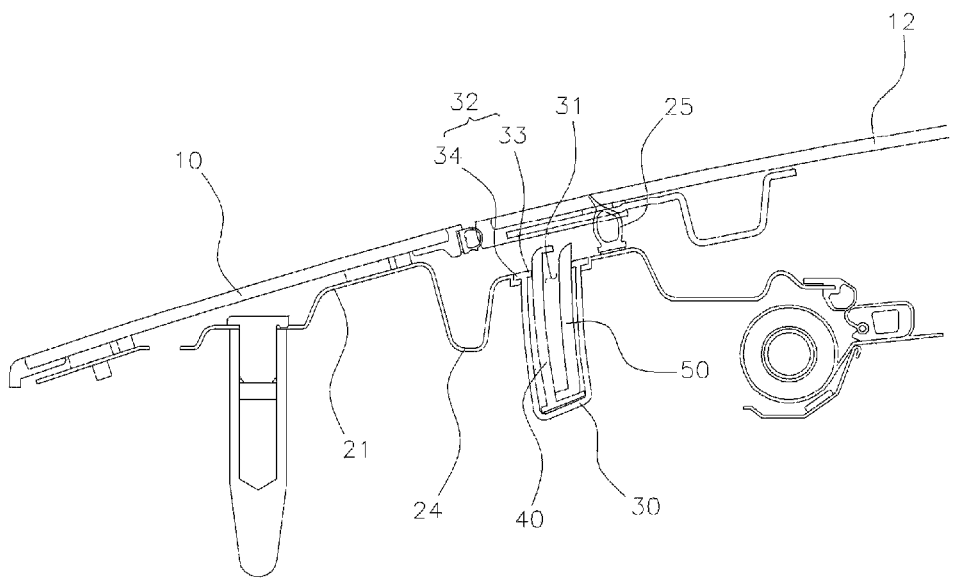
FIG. 3 is a cross-sectional view illustrating an appearance in which a first deflector and a second deflector according to the exemplary embodiment of the present invention are accommodated in a deflector bracket.

As illustrated in FIGS. 2 and 3, the sunroof frame is coupled around the opening portion 11 of the roof panel 10 and serves to support the sunroof glass 12, and specifically, the sunroof frame includes the front frame 21 which is coupled at the front side of the opening portion 11, the rear frame 22 which is coupled to the rear side of the opening portion 11, and the pair of side frames 23 which are coupled to the lateral sides of the opening portion 11.

As illustrated in FIG. 2, each of the side frames 23 is formed as a rail so that the sunroof glass 12 slides in the forward and rearward direction of the vehicle to open and close the opening portion 11 in the roof panel 10.

As illustrated in FIG. 3, the rainwater drainage portion 24 is formed in the front frame 21 in the vehicle width direction to serve to discharge external moisture such as rainwater that flows in when the sunroof glass 12 is opened, or flows in between the sunroof glass 12 and the roof panel 10.

Figure 1B:
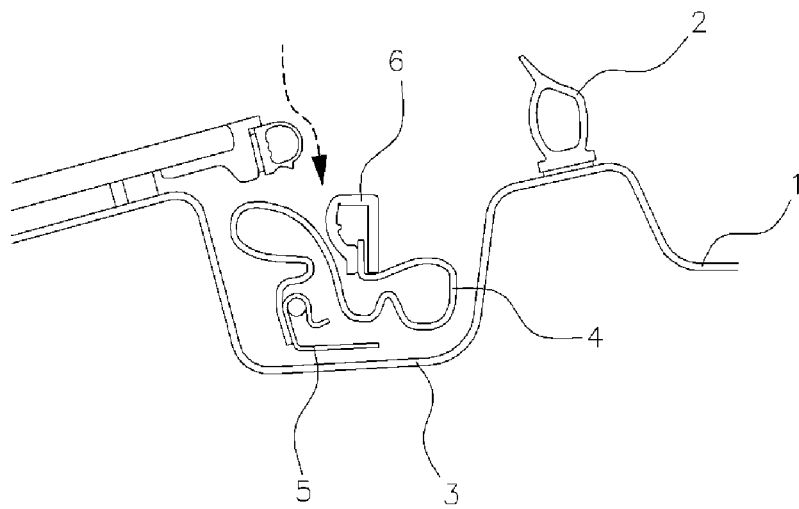
FIG. 1B is a partial cross-sectional view illustrating an appearance in which the deflector is accommodated in a rainwater drainage portion in the structure of the sunroof deflector in the related art.

Unlike the related art in which the rainwater drainage portion 3 provides a large space for accommodating the deflector 4 as illustrated in FIG. 1B, the rainwater drainage portion 24 according to the exemplary embodiment of the present invention is formed to have a size smaller than that of the rainwater drainage portion 3 in the related art so that the deflector bracket 30, which will be described below, may be separately coupled to be adjacent to a rear side of the rainwater drainage portion 24, as illustrated in FIG. 3.

As illustrated in FIG. 3, the deflector bracket 30 is coupled at the rear side of the rainwater drainage portion 24 in the vehicle width direction to provide a space for accommodating the first deflector 40 and the second deflector 50 that will be described below, and serves to guide the first deflector 40 and the second deflector 50 when the first deflector 40 and the second deflector 50 protrude.

The deflector bracket 30 may be formed to have a structure in which an upper end inlet 31 of the deflector bracket 30 is formed to have a surface that corresponds to and is matched with a horizontal surface of the front frame 21, and a space portion is formed in the deflector bracket 30 by being recessed downward from the upper end inlet 31.

As illustrated in FIG. 3, bracket projections 32 protrude around the upper end inlet 31 of the deflector bracket 30. Specifically, the bracket projections 32 include an inner bracket projection 33 which protrudes to the inside of the deflector bracket 30, and an outer bracket projection 34 which protrudes to the outside of the deflector bracket 30.

The inner bracket projection 33 prevents the first deflector 40 from being completely pulled out of the deflector bracket 30, as will be described below, and the outer bracket projection 34 serves to provide a joint surface between the deflector bracket 30 and the front frame 21.

As illustrated in FIG. 3, the sealing weather strip 25 is coupled to the front frame 21 in the vehicle width direction at the rear side of the deflector bracket 30 to serve to prevent the occurrence of noise and block external foreign substances from flowing into the interior of the vehicle.

As described above, the first deflector 40 and the second deflector 50 according to an exemplary embodiment of the present invention are accommodated in the deflector bracket 30 disposed outside the sealing weather strip 25, and quickly lifted upward when the sunroof glass 12 is opened, and the present invention also has an advantageous effect in terms of a length at which the sunroof glass 12 is opened.

Figure 4:
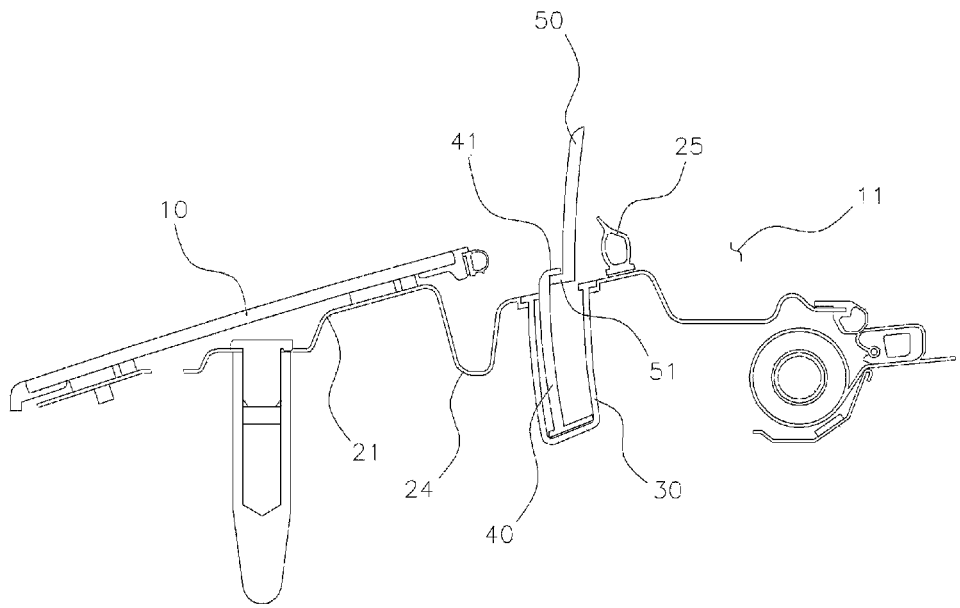
FIG. 4 is a cross-sectional view illustrating an appearance in which the second deflector according to the exemplary embodiment of the present invention protrudes upward from an opening portion of a roof panel.
Figure 5:
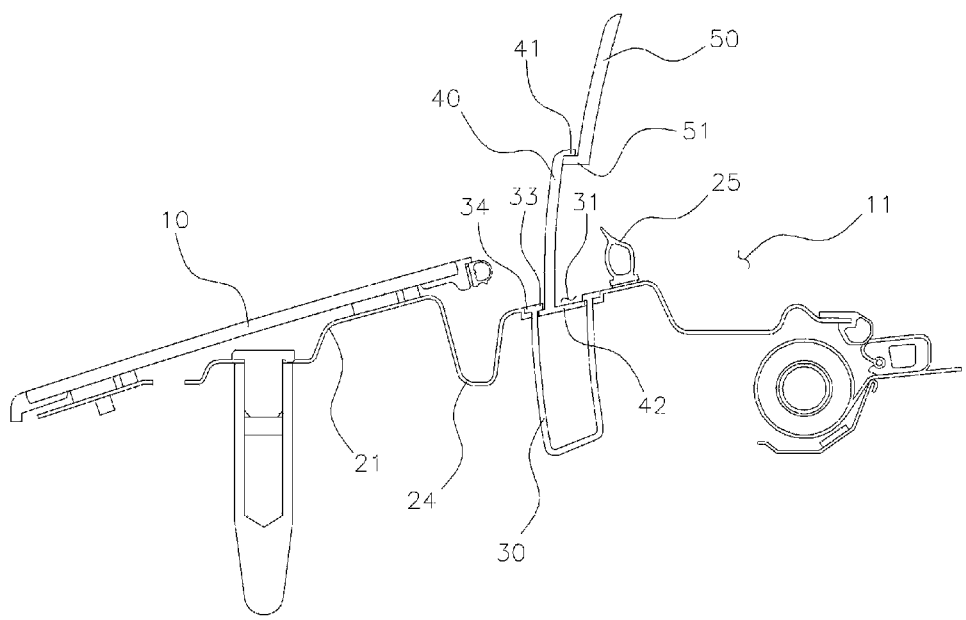
FIG. 5 is a cross-sectional view illustrating an appearance in which the first deflector and the second deflector according to the exemplary embodiment of the present invention protrude upward from the opening portion of the roof panel.

As illustrated in FIGS. 4 and 5, the first deflector 40 is accommodated in the deflector bracket 30 to be slidable upward and downward, and may protrude to the outside of the opening portion 11, and the first catching portion 41, which protrudes toward the rear side of the vehicle, is coupled to the rear surface of the upper end of the first deflector 40.

As illustrated in FIG. 5, at the rear side of the first deflector 40, the second deflector 50 is accommodated in the deflector bracket 30 to be slidable upward and downward, and the second catching portion 51, which protrudes toward the front side of the vehicle to be caught by the first catching portion 41, is coupled to the front surface of the lower end of the second deflector 50.

As illustrated in FIG. 4, the second deflector 50 is moved upward without affecting the first deflector 40 until the second catching portion 51 comes into contact with the first catching portion 41, and thereafter, as illustrated in FIG. 5, the first deflector 40 protrudes to the outside of the opening portion 11 when the second deflector 50 is moved upward in a state in which the second catching portion 51 is caught by the first catching portion 41.

As illustrated in FIG. 5, a lower end portion 42 of the first deflector 40 is extended to have a length identical to a length in the forward and rearward direction of the space portion in the deflector bracket 30, and as a result, the lower end portion 42 of the first deflector 40 is caught by the inner bracket projection 33 so that the first deflector 40 is prevented from being pulled out to the outside of the deflector bracket 30.

As illustrated in FIG. 2, the pair of deflector arms 60 has the rear end portions rotatably coupled to the side frames 23, and the front end portions coupled to both sides of the upper end of the second deflector 50 to serve to move the second deflector 50 upward and downward.

The rear end portion of the deflector arm 60 is connected to a separate electrically-powered device to be rotated clockwise or counterclockwise. Otherwise, the rear end portion of the deflector arm 60 protrudes upward from the opening portion 11 by elastic force of a spring disposed at a lower end of the deflector arm 60 when the sunroof glass 12 is moved rearward, and is moved downward from the opening portion 11 while being compressed by a front end of the sunroof glass 12 when the sunroof glass 12 is moved forward.

Figure 6A:
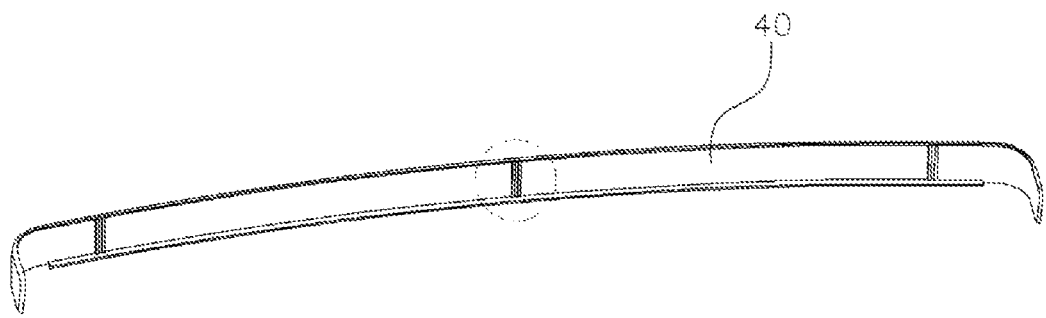
FIGS. 6A and 6B are perspective views illustrating an appearance in which a guide unit is coupled to the first deflector according to the exemplary embodiment of the present invention.
Figure 6B:
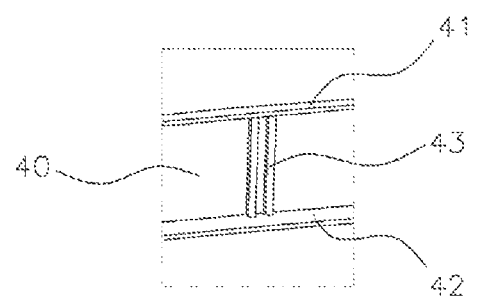

As illustrated in FIGS. 6A and 6B, a plurality of guide units 43 each of which is formed as a rail is vertically coupled to a rear surface of the first deflector 40 between the lower end portion 42 and the first catching portion 41 of the first deflector 40.

Specifically, the guide unit 43 has a structure in which two members each having a '⊐' shape are vertically disposed while facing each other, and the two members are disposed to be spaced apart from each other to form a predetermined space therebetween.

Figure 7A:
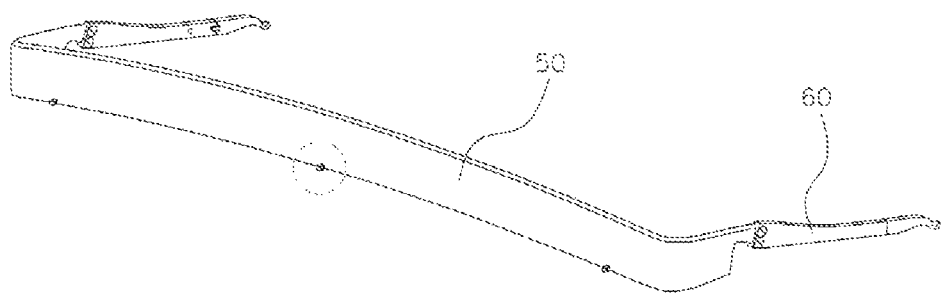
FIGS. 7A and 7B are perspective views illustrating an appearance of a second catching portion of the second deflector according to the exemplary embodiment of the present invention.
Figure 7B:
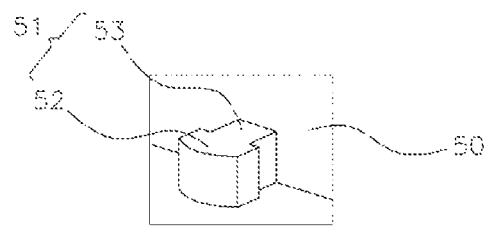

As illustrated in FIGS. 7A and 7B, the second catching portions 51 of the second deflector 50 may include a plurality of sliders 52 each of which is accommodated in the guide unit 43 to be slidable upward and downward, and a plurality of support portions 53 each of which connects the slider 52 with the second deflector 50.

The slider 52 has a width identical to an inner width of the guide unit 43, that is, has a width that corresponds to a distance between the two members spaced apart from each other, and as a center portion of a front surface of the slider 52 is formed as a surface that is curved forward, the slider 52 is configured to entirely have a 'D'-shaped cross section, when viewed from the top side.

The support portion 53 may be formed to have a width identical to a width of a rear end of the guide unit 43, that is, a width corresponding to a distance between rear ends of the two members spaced apart from each other, or have a width slightly smaller than a distance between the rear ends of the two members spaced apart from each other.

Since the width of the slider 52 is identical to the inner width of the guide unit 43 as described above, a movement of the second deflector 50 in the forward and rearward direction and in the leftward and rightward direction is restricted, and since the front surface of the slider 52 has a curved shape, the second deflector 50 is easily moved upward and downward.

In the illustrated exemplary embodiment, the number of guide units 43 is three, and the number of second catching portions 51 is three, but the numbers of guide units 43 and second catching portions 51 may be varied depending on a shape of the deflector, a type of vehicle, a material of the deflector, and the like, and various configurations such as a configuration in which a roller-shaped slider 52 is moved along the guide unit 43, or a configuration in which a spherical slider 52 is moved along the guide unit 43, may be provided.

As illustrated in FIGS. 6A, 6B, 7A and 7B, the first deflector 40 and the second deflector 50 each are formed as a '⊐'-shape plate both ends of which are bent rearward, and may be configured as a hard type deflector that is made of one material of plastic, steel or aluminum.

The portions of the first deflector 40 and the second deflector 50 which are bent rearward are rounded in a rounded shape so that wind may be naturally directed toward the outside of the opening portion 11 of the roof panel 10 when the vehicle travels.

Since the first deflector 40 and the second deflector 50 are formed as a hard type deflector as described above, the first and second deflectors 40 and 50 may more effectively change the direction of the wind upward from the opening portion 11 in comparison with the fabric type deflector, thereby basically resolving the problem that the fabric type deflector is frozen and adhered in a state in which the fabric type deflector is folded.

Figure 8:
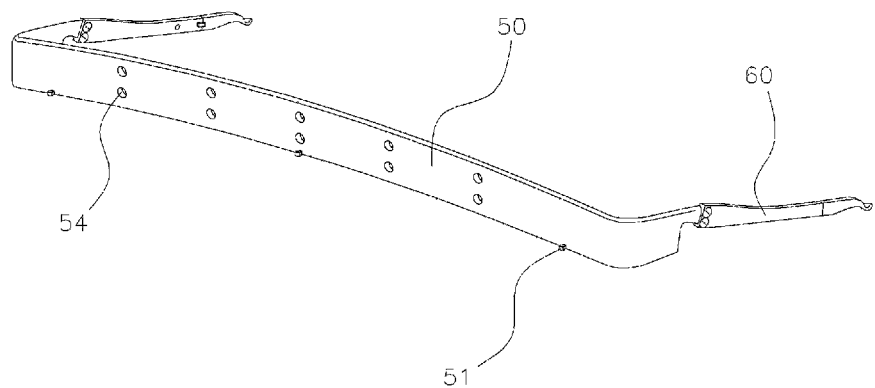
FIG. 8 is a perspective view illustrating an appearance in which holes are formed in a second deflector according to another exemplary embodiment of the present invention.

As illustrated in FIG. 8, a plurality of holes 54, which horizontally penetrates the second deflector 50, is formed in the second deflector 50, thereby minimizing wind noise that is generated when the wind collides with the second deflector 50, which protrudes upward from the opening portion 11 of the roof panel 10, when the vehicle travels at a high speed.

That is, as illustrated in FIGS. 4 and 8, when the vehicle travels at a high speed, the driver in the vehicle adjusts the sunroof glass 12 so that only the second deflector 50 having the holes 54 protrudes upward from the opening portion 11, such that air passing over the second deflector 50 is offset by air passing through the holes 54, thereby minimizing wind noise.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a sunroof deflector comprising:
 a roof panel which is disposed at a ceiling of a vehicle, and has an opening portion that is openable and closable by a sunroof glass;
 a sunroof frame which is coupled around the opening portion, and includes a front frame that is coupled at a front side of the opening portion, a rear frame that is coupled at a rear side of the opening portion, and a pair of side frames that is coupled to lateral sides of the opening portion;
 a deflector bracket which is disposed between a rainwater drainage portion and a sealing weather strip that are formed at the front frame, and coupled in a vehicle width direction;
 a first deflector which is accommodated in the deflector bracket to be slidable upward and downward, selectively protrudes to an outside of the opening portion, and has a first catching portion formed to a rear surface of an upper end thereof;
 a second deflector which is accommodated in the deflector bracket to be slidable upward and downward, selectively protrudes to the outside of the opening portion, and has a second catching portion that is formed to a front surface of a lower end thereof and protrudes to be selectively caught by the first catching portion; and
 at least a deflector arm, the deflector arm including a rear end portion rotatably coupled to one of the side frames, and a front end portion coupled to a side of an upper end of the second deflector to move the second deflector upward and downward, wherein when the second deflector is moved upward in a state in which the second catching portion is caught by the first catching portion, the first deflector protrudes to the outside of the opening portion.

2. The structure of claim 1,
wherein a plurality of guide units, which is formed as a rail, is vertically coupled to a rear surface of the first deflector between a lower end portion and the first catching portion of the first deflector, and
wherein the second catching portions of the second deflector include a plurality of sliders which is accommodated in the guide units to be slidable upward and rearward, and a plurality of support portions which connects each of the sliders with the second deflector.

3. The structure of claim 2, wherein the slider has a width identical to an inner width of the guide unit, and a center portion of a front surface of the slider is formed as a surface that is curved forward.

4. The structure of claim 1, wherein the first deflector and the second deflector each are formed as a '⊏'-shaped plate both ends of which are bent rearward.

5. The structure of claim 4, wherein the first deflector and the second deflector each are made of one material of plastic, steel or aluminum.

6. The structure of claim 1, wherein the deflector bracket further includes a bracket projection that protrudes on an upper end inlet of the deflector bracket to prevent the first deflector from being completely pulled out of the deflector bracket.

7. The structure of claim 1, wherein the second deflector further includes a plurality of holes that horizontally penetrates the second deflector to minimize wind noise that is generated when the vehicle travels at a high speed.

* * * * *